(12) United States Patent
Kokubun et al.

(10) Patent No.: US 8,811,786 B2
(45) Date of Patent: Aug. 19, 2014

(54) COUPLED SYSTEM MULTI-CORE FIBER, COUPLING MODE MULTIPLEXER AND DEMULTIPLEXER, SYSTEM FOR TRANSMISSION USING MULTI-CORE FIBER AND METHOD FOR TRANSMISSION USING MULTI-CORE FIBER

(75) Inventors: Yasuo Kokubun, Kanagawa (JP); Masanori Koshiba, Hokkaido (JP); Toshio Morioka, Tokyo (JP)

(73) Assignees: National University Corporation Yokohama National University, Yokohama-shi (JP); National University Corporation Hokkaido University, Sapporo-shi (JP)

( * ) Notice: Subject to any disclaimer, the term of this patent is extended or adjusted under 35 U.S.C. 154(b) by 531 days.

(21) Appl. No.: 13/121,465

(22) PCT Filed: Oct. 2, 2009

(86) PCT No.: PCT/JP2009/067234
§ 371 (c)(1),
(2), (4) Date: Mar. 29, 2011

(87) PCT Pub. No.: WO2010/038861
PCT Pub. Date: Apr. 8, 2010

(65) Prior Publication Data
US 2011/0188855 A1   Aug. 4, 2011

(30) Foreign Application Priority Data
Oct. 3, 2008  (JP) .................. 2008-258286

(51) Int. Cl.
*G02B 6/02* (2006.01)
*G02B 6/28* (2006.01)

(52) U.S. Cl.
CPC .......... *G02B 6/02042* (2013.01); *G02B 6/2804* (2013.01)
USPC .......................... 385/126; 385/123; 385/124

(58) Field of Classification Search
USPC ........................................................ 385/126
See application file for complete search history.

(56) References Cited

U.S. PATENT DOCUMENTS

2002/0146226 A1   10/2002  Davis et al.
2002/0176677 A1*  11/2002  Kumar et al. ................. 385/126
(Continued)

FOREIGN PATENT DOCUMENTS

CN   101122653 A   2/2008
WO   99/05550 A1   2/1999
(Continued)

OTHER PUBLICATIONS

International Search Report of PCT/JP2009/067234, date of mailing Dec. 1, 2009.
(Continued)

*Primary Examiner* — Hemang Sanghavi
(74) *Attorney, Agent, or Firm* — Westerman, Hattori, Daniels & Adrian, LLP (57) ABSTRACT

The multi-core fiber of the present invention uses a multi-core fiber configuration, compatible with the "coupled" operation mode in which coupling between cores is positively utilized, to carry out mode division multiplexing transmission via a multi-core fiber that contains multiple single-mode cores in one optical fiber. The multi-core fiber of the present invention uses a configuration in which mode multiplexing transmission is carried out using a multi-core fiber that contains multiple single-mode cores in one optical fiber, wherein multiple cores are strongly coupled intentionally to form a coupled multi-core fiber that makes the coupled modes correspond, one to one, to the transmission channels.

4 Claims, 9 Drawing Sheets

(56) References Cited

U.S. PATENT DOCUMENTS

| | | | |
|---|---|---|---|
| 2011/0274398 A1* | 11/2011 | Fini et al. ............... | 385/124 |
| 2012/0087626 A1* | 4/2012 | Nagashima et al. ........ | 385/124 |
| 2012/0183304 A1* | 7/2012 | Winzer et al. ............. | 398/142 |
| 2013/0039627 A1* | 2/2013 | Li et al. ................... | 385/126 |
| 2013/0251320 A1* | 9/2013 | Hayashi ................... | 385/100 |
| 2013/0302002 A1* | 11/2013 | Imamura ................... | 385/127 |

FOREIGN PATENT DOCUMENTS

| | | |
|---|---|---|
| WO | 03/048826 A2 | 6/2003 |
| WO | 2007-100924 A1 | 9/2007 |

OTHER PUBLICATIONS

Yasuo Kokubun et al., "Proposal of Heterogeneous Uncoupled and Homogeneous Coupled Multicore Fibers for Space/Mode-Division Multiplexing"; The Institute of Electronics Information and Communication Engineers; (2009) pp. 165-170 w/English abstract.

Yasuo Kokubun et al., "Novel multi-core fibers for mode division multiplexing: proposal and design principle"; IEICE 2009; pp. 522-528.

Yasuharu Suematsu et al., "Refractive Index Distribution and Group Delay Characteristics in Multimode Dielectric Optical Waveguides"; Translation IECE; 74/9 vol. 57-C No. 9 w/partial English translation.

Ronald C. Stearns et al., "Angular Division Multiplexer for Fiber Communication Using Graded-Index Rod Lenses" Journal of Lightwave Technology, vol. Lt-2. No. 4, Aug. 1984.

C.P. Tsekrekos et al., "Temporal Stability of a Transparent Mode Group Diversity Multiplexing Link"; IEEE Photonics Technology Letter, vol. 18 No. 23, Dec. 1, 2006; pp. 2484-2486.

Martin Feldman et al., "High Speed, High Capacity Bused Interconnects Using Optical Slab Waveguides".

Katsunori Imamura et al., "Multi-core holey fibers for ultra large capacity wide-band transmission"; B-13-22. w/English abstract.

Hiroshi Yoshikawa et al., "Analysis of Asymmetric two-Core Single-Mode Opical Fibers for Subscriber Lines" C-I, vol. J74-C-I. w/English abstract.

S. Inao et al., "High density Multicore-Fiber Cable"; pp. 370-384.S. Bogdan Rosinski et al., "Mutichannel Transmission of a Multicore Fiber Coupled with Vertical-Cavity Surface-Emitting Lasers" Journal of Lightwave Technology, vol. 17, No. 5, May 1999; pp. 807-809. B.

W. E. P. Padden et al., "Coupling in a twin-core microstructured polymer optical fiber"; Applied Physics Letters; Mar. 8, 2004; vol. 84, No. 10, pp. 1689-1691.

Written Opinion of International Search Authority mailing date Jan. 12, 2009, issued in International Application No. PCT/JP2009/067234.

European Search Report dated May 22, 2012, issued in corresponding European Patent Application No. 09817893.2, (13 pages).

Romaniuk R et al., "Multicore single-mode soft-glass optical fibers", Optica Applicata, vol. 29, No. 1-2, Jan. 1, 1999, pp. 15-49.

Notification of Transmittal of Translation of the International Preliminary Report on Patentability (Form PCT/IB/338) of International Application No. PCT/JP2009/067234 mailed May 26, 2011, with Forms PCT/IB/373 and PCT/ISA/237.

Japanese Office Action dated Jan. 15, 2013, issued in corresponding Japanese Patent Application No. 2010-531925, with English translation (6 pages).

Chinese Office Action dated Nov. 29, 2012, issued in corresponding Chinese Patent Application No. 200980139152.7 (20 pages).

International Preliminary Report on Patentability for PCT/JP2009/067234 dated Apr. 5, 2011.

Notification of Transmittal of Translation of the International Preliminary Report on Patentability Report on Patentability (Form PCT/IB/326) of International Application No. PCT/JP2009/067234 mailed Apr. 14, 2011 with Forms PCT/IB/373 and PCT/ISA/237.

Chinese Office Action dated Aug. 12, 2013, issued in corresponding Chinese Patent Application No. 2009801391521, w/ English translation.

Japanese Office Action dated Dec. 3, 2013, issued in corresponding Japanese Patent Application No. 2010-531925 with English translation (6 pages).

* cited by examiner

COUPLED SYSTEM MULTI-CORE FIBER, COUPLING MODE MULTIPLEXER AND DEMULTIPLEXER, SYSTEM FOR TRANSMISSION USING MULTI-CORE FIBER AND METHOD FOR TRANSMISSION USING MULTI-CORE FIBER

TECHNICAL FIELD

The present invention relates to a multi-core fiber suitable for mode multiplexed transmission, and more particularly to a coupled multi-core fiber and a mode multiplexer/demultiplexer at the input and output ends of the coupled multi-core fiber and to a multi-core fiber transmission system that uses both mode division multiplexing and space division multiplexing where a coupled/uncoupled hybrid multi-core fiber is used for high-density space division multiplexing with multiple coupled multi-core groups in the uncoupled state.

BACKGROUND ART

Conventionally, study has been conducted on a multi-mode fiber, and many methods have been proposed for solving a transmission capacity limitation caused by a mode group delay difference. One of the proposed methods is that the mode groups are separated for electrically equalizing the group delay difference (Non-Patent Document 1). After that, based on the fact that the mode propagation angle corresponds approximately to the mode order in a step-index fiber, angular division multiplexing was proposed (Non-Patent Document 2). In addition, in 2006, mode group diversity multiplexing was proposed in which almost the same concept is applied to a graded-index fiber (Non-Patent Document 3). In all fibers described in those documents, each eigen-mode is not used as an independent transmission channel represented in the orthogonal function system of field profile but is used as a mode group for multiplexing/demultiplexing using propagation angle differences, with the result that the transmission capacity is smaller than that of a single-mode fiber. That is, the technologies described in those documents are not those for increasing the transmission capacity to the maximum.

Non-Patent Document 4 describes mode division multiplexing in which each of the modes of a multimode fiber is made to correspond to a transmission channel.

The technology described in Non-Patent Document 5 is known as a technology for implementing a conventional uncoupled multi-core fiber of homogeneous cores using a photonic crystal fiber.

Non-Patent Document 6 discloses a technology for reducing the crosstalk between two cores, which have different propagation constants, to a desired value or lower.

PRIOR ART DOCUMENTS

Non-Patent Documents

Non-Patent Document 1: Suematsu Yasuharu and Furuya Kazuhito, "Refractive Index Distribution and Group Delay Characteristics in Multimode Dielectric Optical Waveguides", Trans. IECE of Japan, Vol. 57-C, no. 9, pp. 289-296 (1974)

Non-Patent Document 2: R. C. Stearns, C. K. Asawa, S-K Yao, "Angular Division Multiplexing for Fiber Communication Using Graded-Index Rod Lenses", J. Lightwave Technol., vol. LT-4, no. 2, pp. 358-362 (1984)

Non-Patent Document 3: C. P. Tsekrekos, M. de Boer, A. Martinez, F. M. J. Willems, A. M. J. Koonen, "Temporal Stability of a Transparent Mode Group Diversity Multiplexing Link", Photon. Technol. Lett., vol. 18, no. 23, pp. 2484-2486 (2006)

Non-Patent Document 4: Martin Feldman, Ramachandran, Vaidyanathan, and Ahmed El-Amawy High speed, "High Capacity Bused Interconnects Using Optical Slab Waveguides", Lect Notes Comput Sci. Vol. 1586 Page. 924-937(1999)

Non-Patent Document 5: Imamura Katsunori, Mukasa Kazunori, Sugisaki Ryuichi, Miura Yu, Yagi Takeshi, "Multi-core Holey Fibers for Ultra Large Capacity Wide-Band Transmission", 2008 IEICE Communication Society Convention Non-Patent Document 6: Yoshikawa Hiroshi, Yamamoto Yuzo, Oono Yutaka "Analysis of asymmetric two-core single-mode optical fibers for subscriber lines.", Trans. IECE of Japan, C-I Vol. J74-C-I No. 9 pp 307-312, September, 1991

Non-Patent Document 7: S. Inao, T. Sato, H. Hondo, M. Ogai, S. Sentsui, A. Otake, K. Yoshizaki, K. Ishihara, and N. Uchida, "High density multi-core-fiber cable", Proceedings of the 28th International Wire & Cable Symposium (IWCS), pp. 370-384, 1979.

Non-Patent Document 8: B. Rosinski, J. W. D. Chi, P. Grasso, and J. L. Bihan, "Multichannel transmission of a multicore fiber coupled with Vertically-Coupled-Surface-Emitting Lasers", J. Lightwave Technol., vol. 17, no. 5, pp. 807-810, 1999.

DISCLOSURE OF THE INVENTION

Problems to be Solved by the Invention

The electric field distribution of each eigen-mode propagating through an optical fiber is expressed by equation (1) given below.

$$E(r,t) = e_p A_i(r_t) \exp[j(\omega_v t - \beta_i z + \phi)] \quad (1)$$

In equation (1) given above, $e_p$ is a unit polarization vector, $\omega_v$ is a carrier angular frequency (v is a channel number when wavelength multiplexing or frequency multiplexing is used), $A_i(r_t)$ and $\beta_i$ are the amplitude distribution and the propagation constant respectively where i is the mode order, $r_t$ is a horizontal (other than the z direction) coordinate position vector. When multiplexing is performed by combining those parameters $(e_p, \omega_v, A_i(r_t), \phi_i)$ that represent a light-wave, the multiplexing methods that use one of the parameters are dense wavelength division multiplexing (or frequency division multiplexing) that uses $\omega_v$ and polarization multiplexing that uses $e_p$. In addition, because the fiber is a single-mode fiber, there are multilevel transmission such as differential quadrature phase shift keying (DQPSK) and quadrature amplitude modulation (QAM) which are implemented by combining $A_0$ and $\phi_0$ where i=0.

In addition to the multiplexing methods described above, there is mode division multiplexing transmission. This mode division multiplexing is based on the fact that eigen-modes, where the mode orders i of $A_i(r_t)$ are different, form an orthogonal function system.

When a conventionally known multimode fiber is used for mode division multiplexing transmission, it is difficult to realize a mode multiplexer/demultiplexer which is needed to discriminate each eigen-mode as one transmission channel. Therefore, multiplexing is performed, not by mode multiplexing, but by mode group multiplexing.

This means that mode division multiplexing transmission requires that, not a multimode fiber, but a multi-core fiber, in which multiple single-mode cores are stored in one optical fiber, be used. Conventionally known configurations for mode division multiplexing transmission via a multi-core fiber, which is formed by storing multiple single-mode cores in one optical fiber, are described in Non-Patent Document 7 and Non-Patent Document 8.

In the mode division multiplexing disclosed in Non-Patent Document 4, there is a correspondence between each mode of a multimode waveguide and a transmission channel. When demultiplexing is performed using the propagation angle differences in a multimode waveguide having multiple modes, the diffraction angle determined by the size of electromagnetic distribution at the output end becomes larger than the propagation angle difference in the eigen-mode. Therefore, the problem is that the modes cannot be separated and, as a result, mode multiplexing/demultiplexing is difficult.

The technology disclosed in Non-Patent Document 5 is a technology that implements a conventional uncoupled multi-core fiber of homogeneous cores using a photonic crystal fiber. In the technologies disclosed in both Non-Patent Document 4 and Non-Patent Document 5, placing homogeneous cores in close proximity to each other causes an inter-core coupling and, as a result, causes a crosstalk. The problem in this case is that the core interval cannot be narrowed.

In addition, the technology disclosed in Non-Patent Document 7 and Non-Patent Document 8 is a technology that implements a conventional uncoupled multi-core fiber of homogeneous cores. In this case, too, placing homogeneous cores in close proximity to each other causes an inter-core coupling and, as a result, causes a crosstalk. The problem in this case is that the core interval cannot be narrowed.

The technology disclosed in Non-Patent Document 6 is a technology that varies the refractive index difference between the core and the cladding between the two cores and, using the resulting propagation constant difference, avoids a coupling even if the cores are close to each other. However, this document presents a study on the relation between the two cores, which is simply the application of the physical phenomenon, already described in a textbook such as the one given as Non-Patent Document 8, to an optical fiber that stores cores whose cross section is round.

Therefore, it is an object of the present invention to solve the problems described above. More specifically, an object of the present invention is to perform mode division multiplexing transmission using, not a multimode fiber, but a multi-core fiber fabricated by closely storing multiple single-mode cores in one optical fiber.

Means to Solve the Problems

Figure 2:
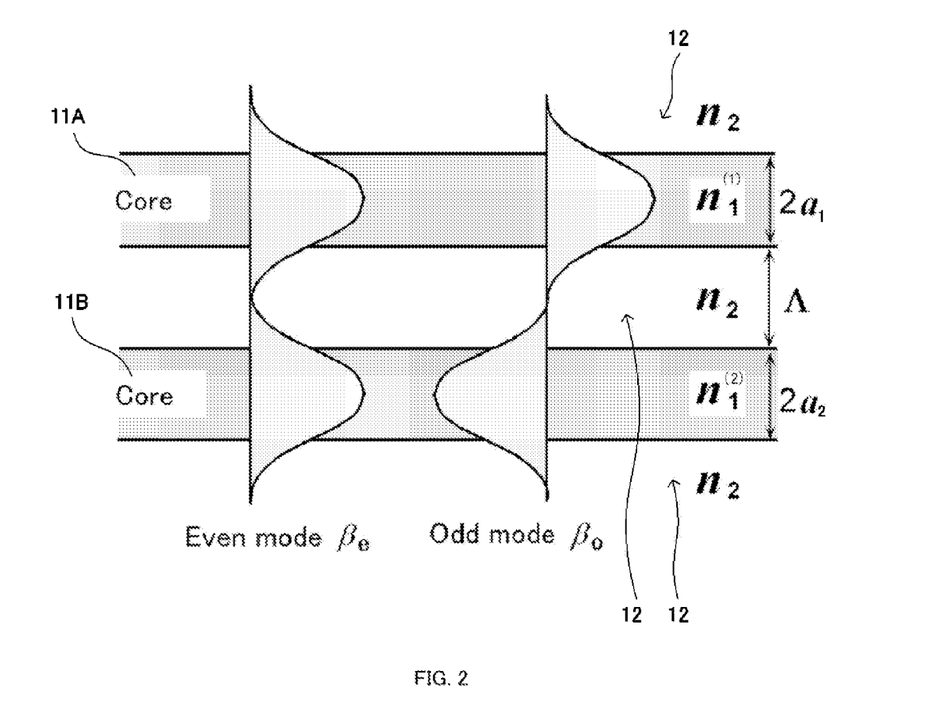
FIG. 2 is a diagram showing a simplest model of the cores of the coupled multi-core fiber of the present invention.

When there are two single-mode fibers and their cores are placed in close proximity to each other, mode coupling is generated between the cores as shown in FIG. 2. Let $\beta_1$ and $\beta_2$ be the propagation constants of the non-perturbed fundamental modes of the two cores respectively when each of them is present alone. Then, when those cores are arranged in parallel to the propagation direction (z direction), the propagation constants $\beta_e$ and $\beta_o$ of the perturbed coupled modes a and b are given respectively as $\beta_e = \beta_{ave} + \beta_c$ and $\beta_o = \beta_{ave} - \beta_c$ as shown in FIG. 3. In this case, $\beta_{ave} = (\beta_1 + \beta_2)/2$ is the average propagation constant, and $\beta_c$ is represented as $\beta_c = (\delta^2 + \kappa^2)^{1/2}$ using the phase mismatching parameter $\delta = (\beta_1 - \beta_2)/2$ and the coupling coefficient $\kappa$.

When the fundamental mode is incident on one of the cores, the z-direction dependence of the normalized optical power $\eta$ in the other core corresponding to the coupling efficiency is represented as $\eta = F \sin^2 \beta_c z$. Note that $F = (\kappa/\beta_c)^2$ is the power coupling ratio. The coupling efficiency $\eta$ has the maximum value when the coupling length $L_c = \pi/(2\beta_c)$ with the maximum value of F. If the phase matching condition $\delta = 0$ is satisfied, $\beta_c = \kappa$ and therefore the maximum value of the coupling efficiency is unity.

The multi-core fiber of the present invention uses a multi-core fiber configuration, compatible with the "coupled" operation aspect in which coupling between cores is positively utilized, to carry out mode multiplexing transmission via a multi-core fiber that contains multiple single-mode cores densely in one optical fiber.

More specifically, the multi-core fiber of the present invention uses a configuration in which mode multiplexing transmission is carried out using a multi-core fiber that contains multiple single-mode cores in one optical fiber, wherein multiple cores are strongly coupled intentionally to create coupled modes, each of which corresponds, to one transmission channel.

The use of this multi-core fiber increases the transmission capacity by the number of cores.

The coupled multi-core of the present invention is a multi-core fiber that contains multiple single-mode cores in one optical fiber wherein a mode multiplexing transmission system is formed by multiplexing coupled modes in the electromagnetic field distribution of the eigen-mode propagating through the fiber.

The present invention provides the mode of a coupled multi-core fiber, the mode of a coupled mode multiplexer/demultiplexer, and the mode of a multi-core fiber transmission system or method.

In the mode of a coupled multi-core fiber of the present invention, there is provided a multi-core fiber that contains multiple single-mode cores in one optical fiber wherein coupled modes are formed in which fundamental eigen-modes of multiple cores are strongly coupled in the electromagnetic distribution of eigen-modes that propagate through the fiber, and a mode division multiplexing transmission system is formed in which coupled modes having different orders are made to correspond to signal transmission channels to multiplex mode-divided transmission channels.

The multi-core fiber of the present invention comprises multiple cores that have the same propagation constant in fundamental modes in single-mode fibers, and each neighboring cores are arranged in a range of a core-to-core distance that places the core-to-core coupled state in a strongly-coupled state, and the multiple cores coupled in the strongly-coupled state form a core group. The core group forms a coupled transmission system, which is mode-divided by multiple coupled modes that have different propagation constants, and makes the coupled modes correspond, one to one, to transmission channels for multiplexing to form a mode division multiplexing transmission system.

The multi-core fiber of the present invention is a multi-core fiber wherein the multiple cores are arranged linearly to form a core group, the center-to-center interval of neighboring cores is set in a range of distance larger than the length of the core diameter but smaller than the twice of the length of the core diameter to strongly couple the cores in the core group.

The multi-core fiber of the present invention comprises multiple core groups. The neighboring core groups are spaced to each other at a core-group to core-group distance at which a core in one core group and a core in another core group are in an uncoupled state between the core groups.

When a core group is configured by linearly arranging multiple cores in the coupled multi-core fiber of the present invention, the arrangement interval between core groups is equal to or larger than the twice of the core diameter to make the core groups uncoupled.

Because mode multiplexing transmission is carried out in the coupled mode based on the orthogonality between the coupled eigen-modes, a mode multiplexer/demultiplexer that converts between isolated cores and coupled modes is required at the input/output ends.

In the configuration of a coupled mode multiplexer/demultiplexer of the present invention, there is provided a multiplexer/demultiplexer that multiplexes/demultiplexes a signal through a coupled mode transmitted by a coupled multi-core fiber in a mode division multiplexing transmission system.

The coupled multi-core fiber is a multi-core fiber that contains multiple single-mode cores in one optical fiber wherein coupled modes are formed in which eigen-modes of multiple cores are coupled in an electromagnetic distribution of eigen-modes that propagate through the fiber, and a mode division multiplexing transmission system is formed in which coupled modes having different orders are made to correspond to signal transmission channels to multiplex transmission channels through mode division.

As a configuration for converting between isolated cores and coupled modes, the multiplexer/demultiplexer comprises arrayed-waveguides having multiple different optical path lengths; a slab waveguide provided on one end of the arrayed-waveguide grating; and coupled waveguides provided on the other end of the arrayed-waveguide grating. The slab waveguide has multiple ports corresponding to the coupled modes of the coupled multi-core fiber, one port for each coupled mode, an optical signal received from the slab waveguide side is converted to a coupled mode of an order corresponding to the position of the port that has received the optical signal and the coupled mode is multiplexed and output from the coupled waveguides, and conversely, a coupled mode signal, received from the coupled waveguides, is demultiplexed and output from the port on the slab waveguide side corresponding to an order of the coupled mode.

The multi-core fiber transmission system of the present invention is a multi-core fiber transmission system that, for use in a mode division multiplexing system, comprises a coupled multi-core fiber and a coupled mode multiplexer/demultiplexer, multiplexes a single-mode optical signal and outputs a coupled mode optical signal in one propagation direction, and demultiplexes a coupled mode optical signal and outputs a single-mode optical signal in the opposite propagation direction.

In the aspect of a multi-core fiber transmission method of the present invention, there is provided a multi-core fiber transmission method that, for use in a mode division multiplexing system implemented by a coupled multi-core fiber, multiplexes a single-mode optical signal and outputs a coupled mode optical signal in one propagation direction, and demultiplexes a coupled mode optical signal and outputs a single-mode optical signal in the opposite propagation direction.

In the multi-core fiber transmission system and the multi-core fiber transmission method, the coupled multi-core fiber is a multi-core fiber that contains multiple single-mode cores in one optical fiber wherein coupled modes are formed in which eigen-modes of multiple cores are strongly coupled in an electromagnetic distribution of eigen-modes that propagate through the fiber, and a mode division multiplexing transmission system is formed in which coupled modes having different orders are made to correspond to signal transmission channels to multiplex transmission channels through mode division.

The mode multiplexer/demultiplexer comprises arrayed-waveguides having multiple different optical path lengths; a slab waveguide provided on one end of the arrayed-waveguide grating; and coupled waveguides provided on the other end of the arrayed-waveguide grating. The slab waveguide has multiple ports corresponding to the coupled modes of the coupled multi-core fiber, one port for each coupled mode, converts an optical signal received from the slab waveguide side to a coupled mode of an order corresponding to the position of the port that has received the optical signal and multiplexes and outputs the coupled mode from the coupled waveguides and, conversely, demultiplexes a coupled mode signal, received from the coupled waveguides, and demultiplexes outputs the demultiplexed signal from the port on the slab waveguide side corresponding to an order of the coupled mode.

In one configuration of the present invention, a mode multiplexer/demultiplexer that converts between a coupled mode and an uncoupled mode in a coupled multi-core fiber may be provided.

Effect of the Invention

As described above, the present invention makes it possible to carry out mode multiplexing transmission using, not a multi-mode fiber, but a multi-core fiber that contains multiple single-mode cores in one optical fiber.

DESCRIPTION OF REFERENCE NUMERALS

10 Coupled multi-core fiber
11 Core
11A-11F Core
$11A_A$-$11D_A$ Core
$11A_B$-$11D_B$ Core
12 Cladding
13, 13A-13H Coupled core group
14A1-14An, 14B1-14Bn, 14C1-14Cn Transmission channel
15 Mode multiplexer/demultiplexer
15A Slab waveguide
15B Arrayed waveguide
15C Coupled waveguide
16, 16a-16d Single-mode fiber

BEST MODE FOR CARRYING OUT THE INVENTION

A preferred embodiment of the present invention will be described in detail below with reference to the drawings.

The following describes a multi-core fiber, more specifically, a coupled multi-core fiber, of the present invention with reference to FIG. 1 to FIG. 9.

A multi-core fiber having homogeneous cores, all of which have an equal propagation constant, is called a "Homogeneous Multi-core Fiber (Homogeneous MCF)", while a fiber having multiple cores, which have different propagation constants, is called a "Heterogeneous Multi-core Fiber (Heterogeneous MCF)". The present invention relates to a coupled multi-core fiber, and a "Homogeneous Multi-core Fiber (Homogeneous MCF)" will be described below.

[Coupled Multi-Core Fiber]

Figure 1:
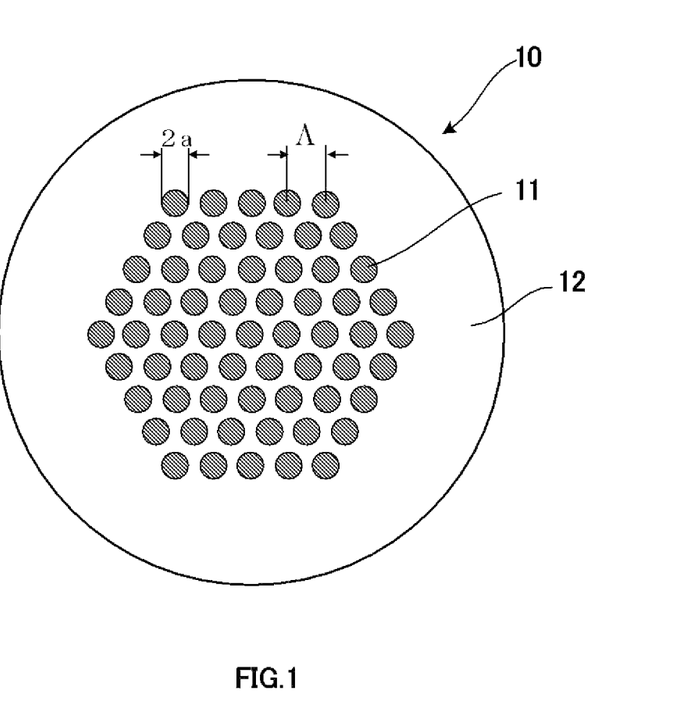
FIG. 1 is a diagram showing the triangular arrangement of the cores of a coupled multi-core fiber of the present invention.

For the core arrangement of a coupled multi-core fiber, the most closely packed arrangement that ensures the highest core density is the triangular arrangement such as that shown in FIG. 1. In the triangular arrangement shown in FIG. 1, the cores that have the same refractive index difference and the same core diameter and have the same propagation constant are arranged closely to positively cause coupling between the cores, and by making each coupled mode between the cores correspond to a transmission channel, a coupled multi-core fiber is configured.

In FIG. 1, a coupled multi-core fiber 10 has cores 11, which have the same propagation constant and are configured in the most closely packed arrangement, and a cladding 12 around the cores. In the figure, the diameter of a core is represented as $2a$, and the interval between the neighboring cores as $\Lambda$.

FIG. 2 is a diagram showing the simplest model of the cores of a coupled multi-core fiber. The model shown in FIG. 2 is an example of a two-coupled planar waveguide. For this model, equation (2) given below is defined $$\gamma^2 = \beta^2 - k_0^2 n_2^2 \quad (2)$$

where the refractive indexes of cores 11A and 11B are equal, that is, $n_1^{(1)} = n_1^{(2)} = n_1$, $\beta$ is the propagation constant of each isolated core, and $\gamma$ is the parameter. Then, in the two-coupled planar waveguide model, two coupled modes are formed, even mode (propagation constant $\beta_e$) and odd mode (propagation constant $\beta_o$), in the weakly coupled approximation.

The propagation constant difference ($\beta_e - \beta_o$) between the even mode and the odd mode in the weakly coupled approximation is approximately represented as follows.

$$\beta_e - \beta_o = 2 \frac{\kappa^2}{\beta} \cdot \frac{1}{\gamma a} \cdot \frac{\exp(-\gamma \Lambda)}{1 + \frac{\kappa^2}{\gamma^2}} \quad (3)$$

The coupling length $L_c$ is represented as follows.

$$L_c = \frac{\pi}{\beta_e - \beta_o} \quad (4)$$

When the coupling length $L_c$ is long, the inter-core coupling is reduced. Conversely, in the strongly-coupled state, the coupling length $L_c$ is short. Strong coupling requires that the propagation constants of the two cores be equal and that the core-to-core distance $\Lambda$ be sufficiently shorter than the core diameter $2a$.

Figure 3A:
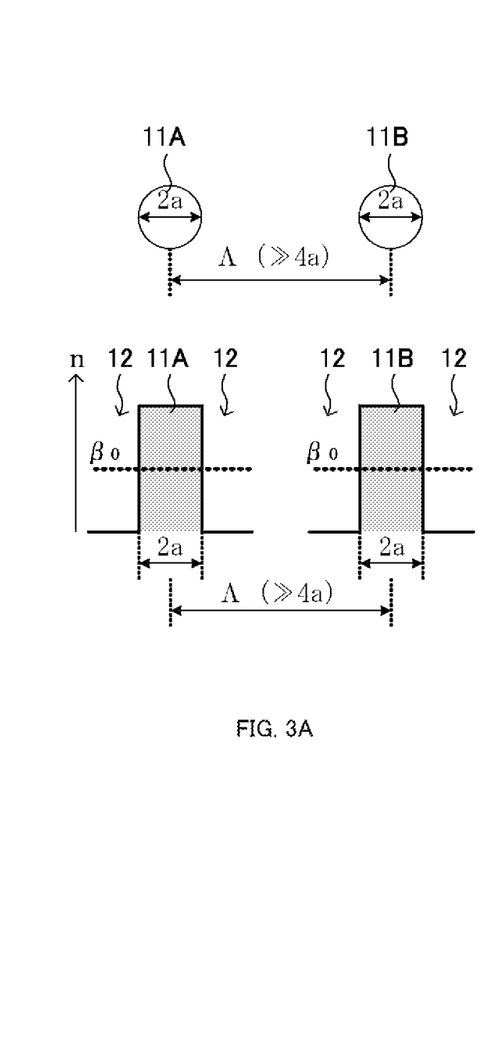
FIG. 3 is a diagram showing coupled-mode propagation constant differences, the principle of the present invention, dependent on the core-to-core distance between two cores.

FIG. 3 is a diagram showing the coupled state dependent on the core-to-core distance in the two coupled waveguides. FIG. 3A is a diagram showing the uncoupled state of the independent waveguides. The core 11A and the core 11B, each of which configures a waveguide, are arranged at an interval of $\Lambda$ ($\ll 4a$) equal to or larger than the twice of the diameter $2a$ of each core. Because the core 11A and the core 11B both have the propagation constant $\beta_0$ and are sufficiently spaced each other with the core-to-core distance $\Lambda$ sufficiently larger than the core diameter $2a$, the two cores are in the uncoupled state. This configuration reduces the cross-section core density, making it difficult to increase the transmission capacity.

In contrast to the configuration described above, the present invention positively makes the most of inter-core coupling to configure a mode division multiplexing transmission system in which the transmission capacity may be increased.

Figure 3B:
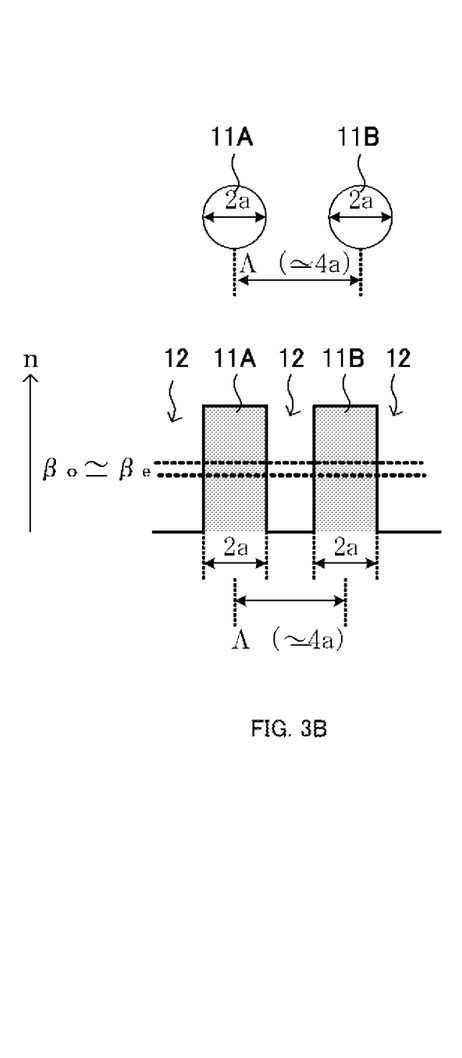

FIG. 3B shows the weakly coupled state. When the core-to-core distance $\Lambda$ between the centers of core 11A and core 11B is set almost equal to the twice of the core diameter $2a$ ($4a = 2 \times 2a$), the two coupled modes, even mode (propagation constant $\beta_e$) and odd mode (propagation constant $\beta_o$), are formed in the weakly coupled approximation and, as shown in FIG. 3B, the weakly coupled state is created. This weakly coupled state, the state of a usual coupled waveguide, is used, for example, for a directional coupler.

In this weakly-coupled state, the difference between the propagation constants ($\beta_e - \beta_o$) is so small that a slight perturbation, such as an irregularity in the core-cladding boundary, causes a mode conversion between the even mode and the odd mode. This mode conversion affects the transmission. To avoid this mode conversion, the core-to-core distance $\Lambda$ between the core 11A and the core 11B is reduced to create the strongly-coupled state.

Figure 3C:
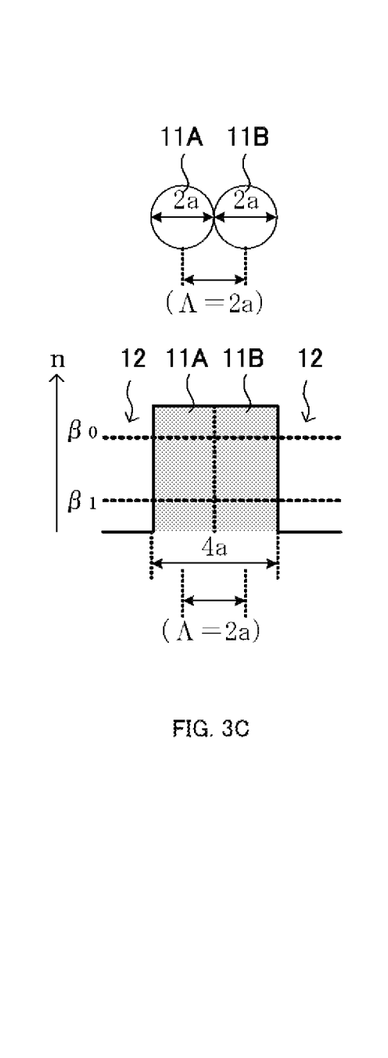

FIG. 3C shows the completely coupled state. The completely coupled state, the ultimate state of strongly coupling, corresponds to the two-mode state. In this completely-coupled state, because the propagation constant difference between the eigen-modes is equal to the propagation constant difference between the fundamental mode and the first order mode, the propagation constant difference between the modes becomes larger and so the mode conversion is not generated in most cases.

Figure 4:
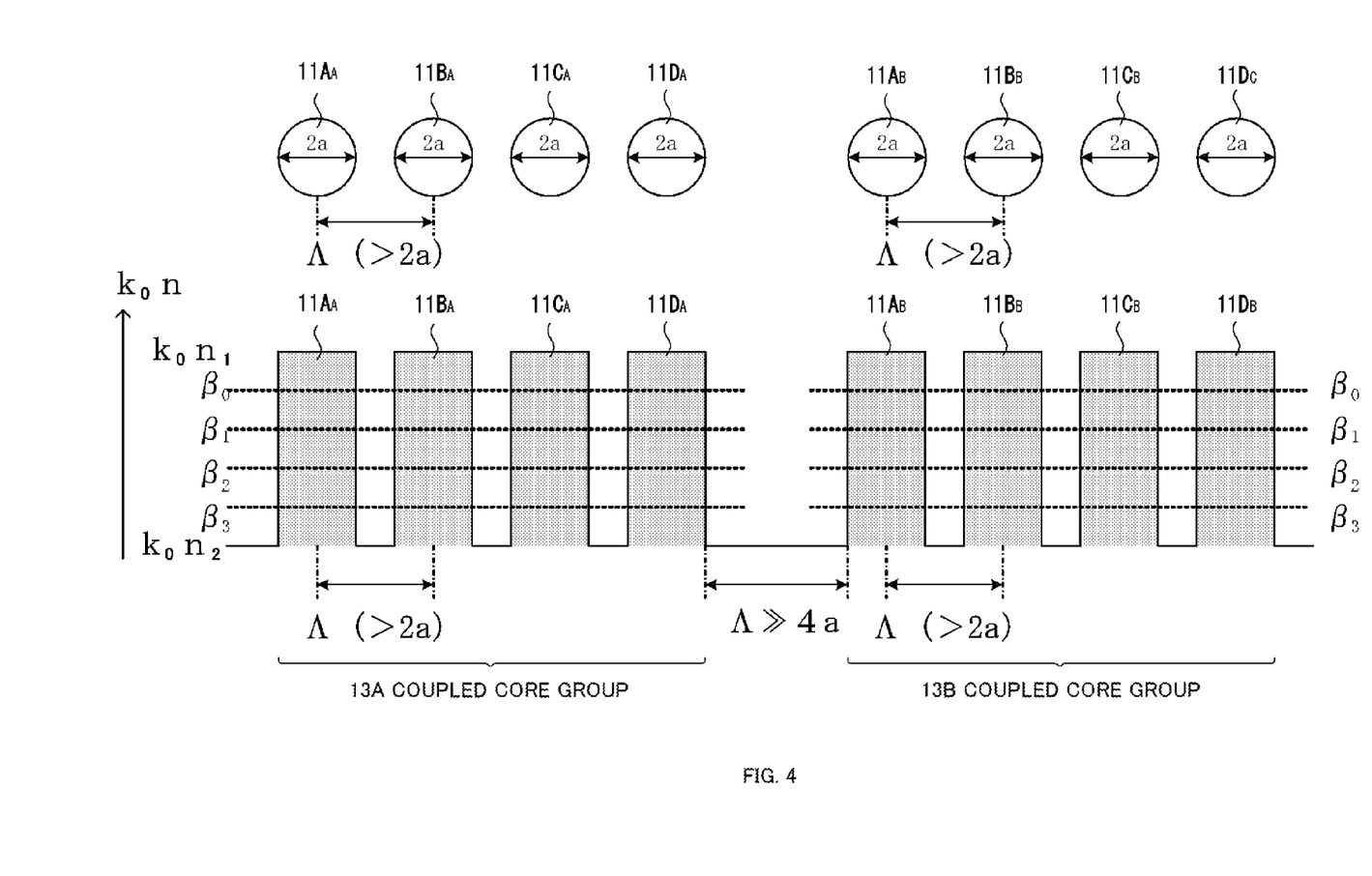
FIG. 4 is a diagram showing the coupled mode propagation constants when four cores, each with a high refractive index difference, are strongly coupled.

FIG. 4 is a diagram showing the propagation constants of the coupled mode when the four cores with a high refractive index difference are strongly coupled. In the example shown in FIG. 4, the configuration is shown in which a coupled core group 13A, composed of four strongly coupled cores $11A_A$-$11D_A$, and a coupled core group 13B, composed of four strongly coupled cores $11A_B$-$11D_B$, are arranged at an interval of $\Lambda$ ($\ll 4a$) equal to or larger than the twice of the core diameter $2a$. Let $n_2$ be the refractive index of the cladding, and $n_1$ be the refractive index of the core. Then, the propagation constants $\beta_0$-$\beta_3$ of the coupled mode, generated by the strong coupling of the four cores $11A_A$-$11D_A$ and the four cores $11A_B$-$11D_B$, are the values obtained by parting the range between $k_0 n_1$ and $k_0 n_2$ depending in the numbers of cores.

When a coupled multi-core fiber is implemented by strong coupling in this way, too many coupled cores, if used, would reduce the propagation constant difference between the coupled modes with the result that the mode conversion problem cannot easily be avoided. This is because the propagation constant difference between the coupled modes becomes smaller than the value generated by dividing the difference between $k_0 n_1$ and $k_0 n_2$ by the number of the coupled cores as shown in FIG. 4. Therefore, to increase the propagation constant difference between the coupled modes in some degree, it is necessary to increase the refractive index difference between the refractive index $n_1$ of the core 11 and the refractive index $n_2$ of the cladding and not to use too many cores.

Under such conditions, the number of cores to be coupled should be four or five assuming that the refractive index difference between the core and the cladding is 1.5% at the highest.

By determining the number of coupled cores as described above, the propagation constant difference in the strongly coupled state may be made the same as the difference between the propagation constant of a conventional single-mode fiber with the relative refractive index difference of 0.3% and the propagation constant of the cladding mode as shown in FIG. 4, and the mode conversion may also be suppressed at the same level.

The coupled multi-core fiber of the present invention performs mode division multiplexing transmission by establishing one-to-one correspondence between the coupled modes of a strongly coupled core group described above and the transmission channels.

Figure 5:
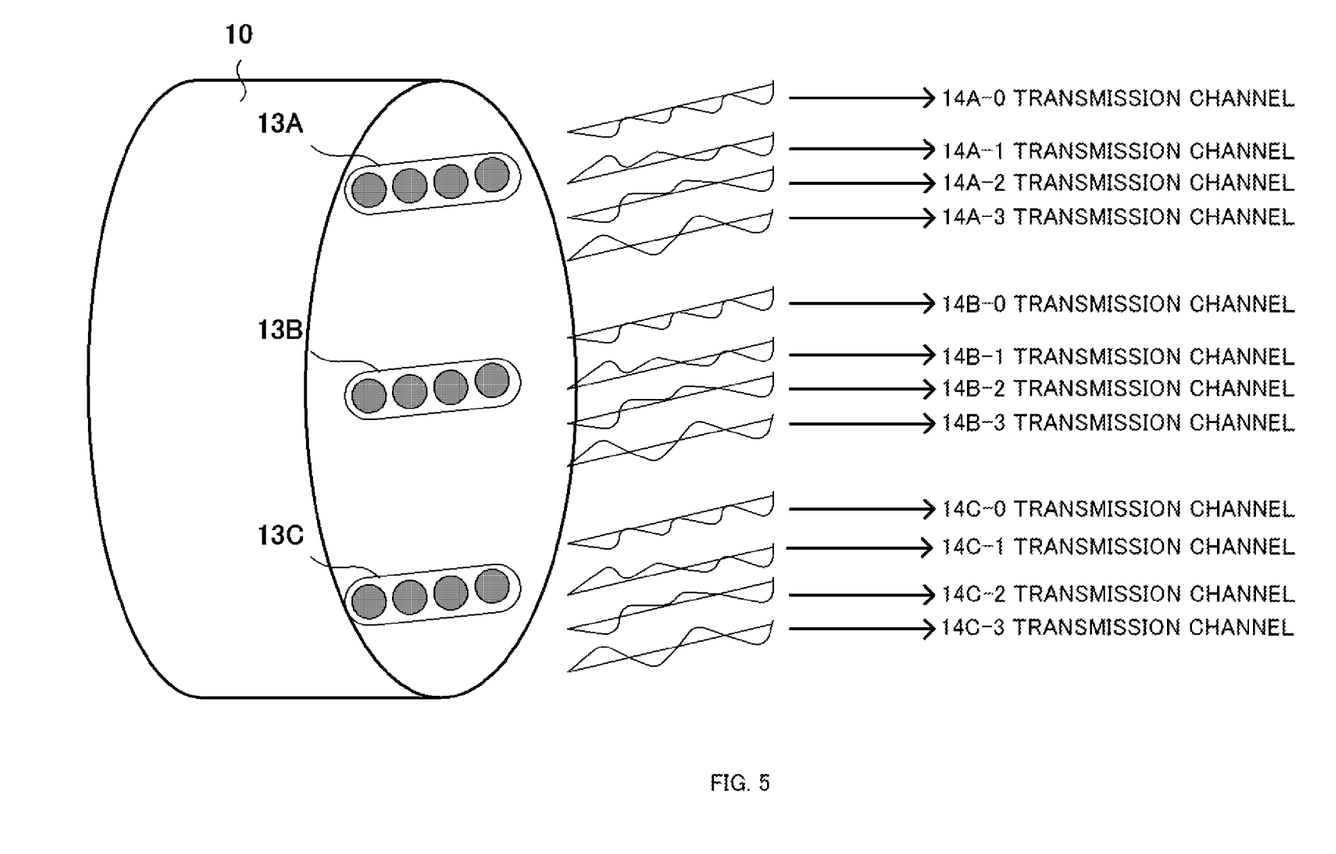
FIG. 5 is a diagram showing the correspondence between the coupled modes of the core groups and the transmission channels in the coupled multi-core fiber of the present invention.

FIG. 5 is a diagram showing the correspondence between the coupled modes of the core groups and the transmission channels in a coupled multi-core fiber of the present invention. The coupled multi-core fiber 10 shown in FIG. 5 comprises coupled core groups 13A-13C each of which has multiple cores spaced to each other at a distance that generates a strongly coupled state. The coupled core groups are spaced to each other at a distance that generates an uncoupled state, or the refractive index difference between the coupled cores and the cladding is different among the core groups. In the coupled core groups 13A-13C, the coupled modes formed by each of the coupled core groups are made to correspond, one to one, to transmission channels 14A0-14An (0-n are coupled-mode orders, and the number of coupled mode orders is equal to the number of coupled cores) and to carry out mode division multiplexing transmission.

Figure 6A:
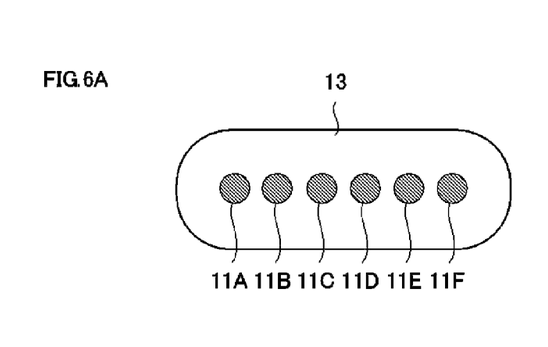
FIG. 6 is a diagram showing an example of the configuration of the coupled multi-core fiber of the present invention.

FIG. 6 is a diagram showing an example of the configuration of a coupled multi-core fiber of the present invention. FIG. 6A shows an example of the configuration of a ribbon-shaped fiber formed by linearly arranging cores 11A to 11F. This configuration ensures compatibility with a mode multiplexer/demultiplexer that will be described later.

The example of the configuration described above shows a case in which the cross section of the fiber is not circular. To make the cross section of the fiber circular as with the conventional fiber, the configuration shown in FIG. 6B is used in which the coupled cores are divided into multiple coupled core groups (groups).

Figure 6B:
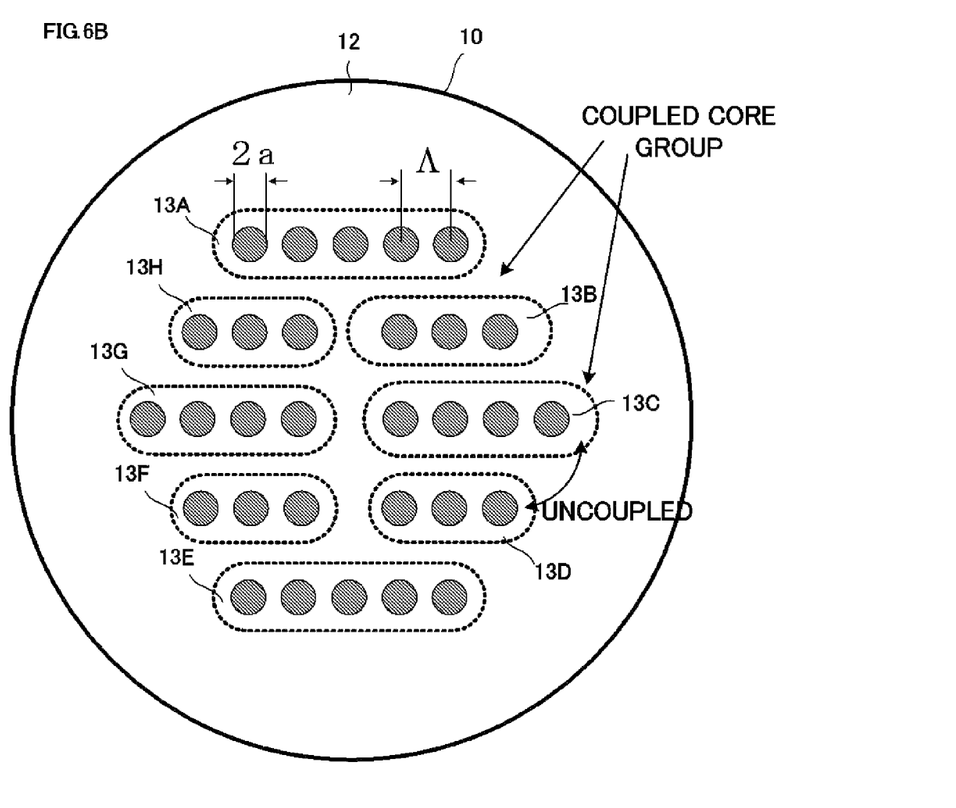

In FIG. 6B, the coupled multi-core fiber 10 comprises multiple coupled core groups 13A-13H. In each of the coupled core groups 13A-13H, multiple cores are linearly spaced to each other at an interval that generates a strongly coupled state. The neighboring coupled core groups are spaced to each other at an interval that generates an uncoupled state, or the refractive index difference between the coupled cores and the cladding is different among the core groups.

One of the merits of the transmission capacity increasing method achieved by a multi-core fiber is an increase in the effective-core cross section area $A_{eff}$, that is, an increase in the total cross section area of the core, because of its anti-nonlinearity and anti-fusibility.

Because the electromagnetic field is distributed all over the coupled cores in the coupled multi-core fiber 10 shown in FIG. 6, the coupled mode contributes to an increase in the total cross section area of the core. However, the intensity distribution is localized in a coupled waveguide due to interference among coupled modes and, as a result, power may concentrate in one core and this power concentration occurs periodically. This problem may be avoided by decreasing the coherence of the light source of the transmission channels corresponding to the coupled modes, that is, by slightly shifting the frequency or by using another light source.

Although arranged linearly in the example of the configuration shown in FIG. 6 given above, the cores may be arranged not only linearly but in any arrangement pattern.

Figure 7A:
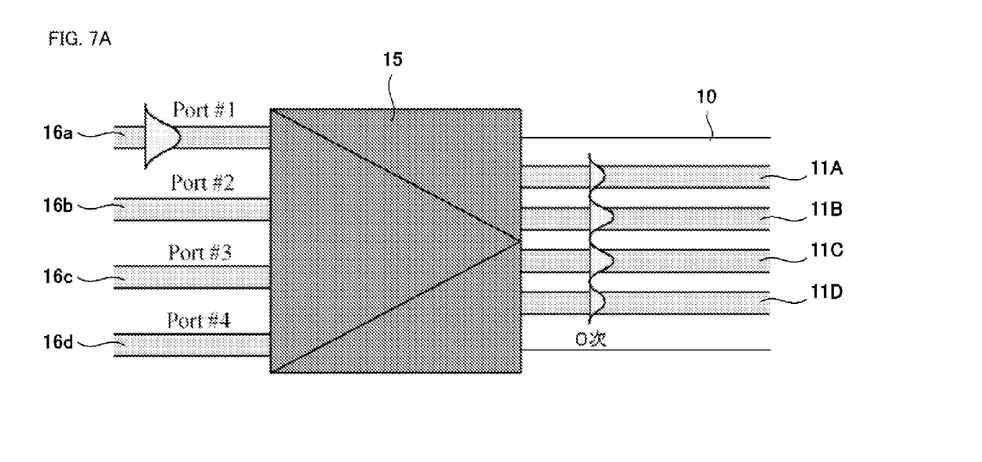
FIG. 7 is a diagram showing the function of a mode multiplexer/demultiplexer of the present invention.
Figure 7B:
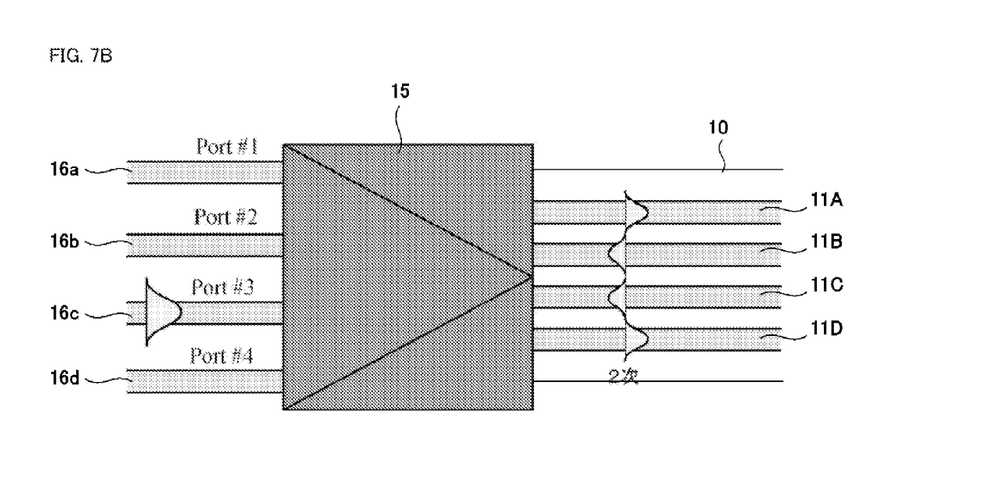
Figure 8:
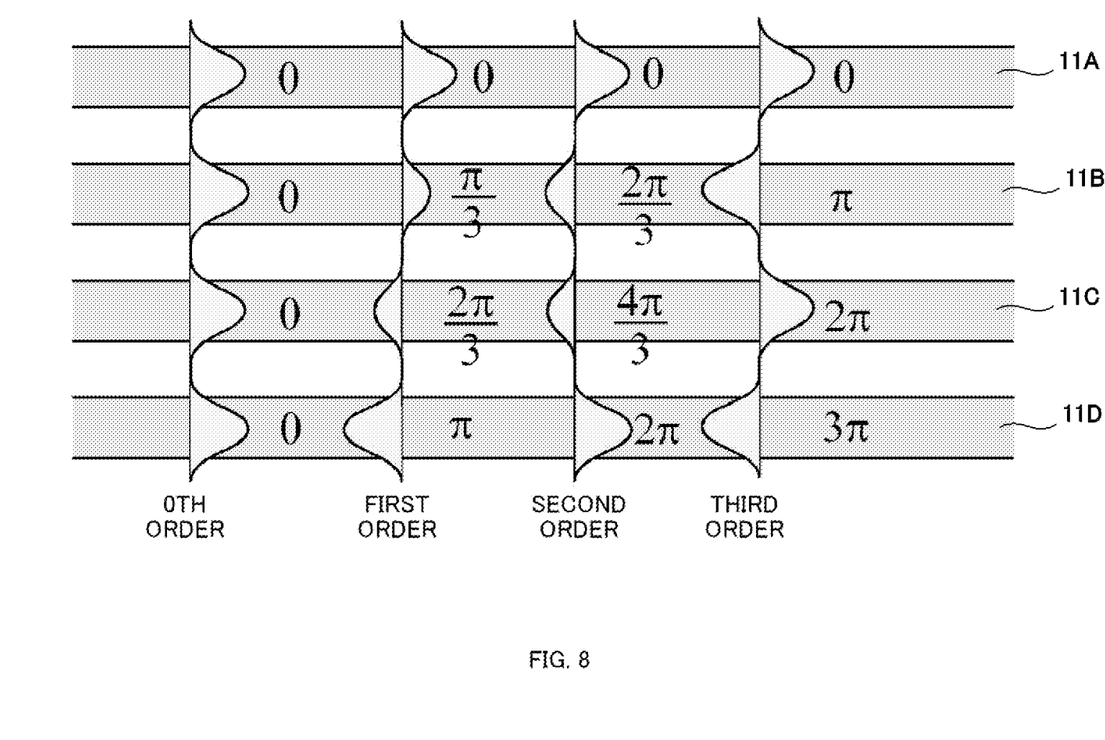
FIG. 8 is a diagram showing the correspondence between the coupled modes in the coupled waveguides of the mode multiplexer/demultiplexer of the present invention and the phase differences among the eigen-modes configuring the coupled modes.

Next, the following describes the transmission via the coupled multi-core fiber of the present invention with reference to FIG. 7 to FIG. 9.

In the transmission using a coupled multi-core fiber, each coupled mode is used as an independent transmission channel. This means that a mode multiplexer/demultiplexer is necessary for multiplexing and demultiplexing between the coupled modes and the signals.

FIG. 7 is a diagram showing a mode multiplexer/demultiplexer. A mode multiplexer/demultiplexer 15, an optical circuit that establishes the correspondence between input port numbers and coupled mode orders, is installed between signal-mode fibers 16a-16d and a coupled multi-core fiber 10. The mode multiplexer/demultiplexer 15 multiplexes an optical signal from the single-mode fibers 16a-16d and transmits the corresponding coupled mode to the coupled multi-core fiber 10. The mode multiplexer/demultiplexer 15, which is used also for reverse conversion, may be used as a mode demultiplexer in the opposite direction. That is, the mode multiplexer/demultiplexer 15 demultiplexes the coupled mode of the coupled multi-core fiber 10 and transmits the resulting optical signal to the single-mode fibers 16a-16d.

FIG. 7A shows that the mode multiplexer/demultiplexer multiplexes the optical signal of input port number #1, to which the single-mode fiber 16a is connected, and transmits the multiplexed signal to the coupled core group, composed of cores 11A to 11D, as the corresponding coupled mode (0th-order mode in this example).

FIG. 7B shows that the mode multiplexer/demultiplexer multiplexes the optical signal of input port number #3, to which the single-mode fiber 16c is connected, and transmits the multiplexed signal to the coupled core group, composed of cores 11A to 11D, as the corresponding coupled mode (2nd-order mode in this example).

This mode multiplexing/demultiplexing function may be explained by the phase differences among the eigen-modes as shown in FIG. 8 in which the coupled modes are represented by combining the fundamental modes of the individual independent waveguides in terms of linear combination.

When the coupled modes are represented by the linear combination of the eigen-modes of the individual independent waveguides, the coupled mode orders correspond to the phase differences. If it is desired to excite the coupled mode of each order by the plane wave at the input end of the coupled waveguides, the angle of incidence should be changed to excite the coupled mode almost selectively.

FIG. 9 is a diagram showing the configuration of a mode multiplexer/demultiplexer of the present invention. A mode multiplexer/demultiplexer 15 comprises a slab waveguide 15A, arrayed waveguides 15B, and coupled waveguides 15C. The arrayed waveguides 15B are provided to vary the light path length. In the planar circuit, this configuration may be configured in which the slab waveguide part, which follows the arrayed waveguide grating filter, is removed and the input is moved from the arrayed waveguide part directly to the coupled waveguides.

Figure 9A:
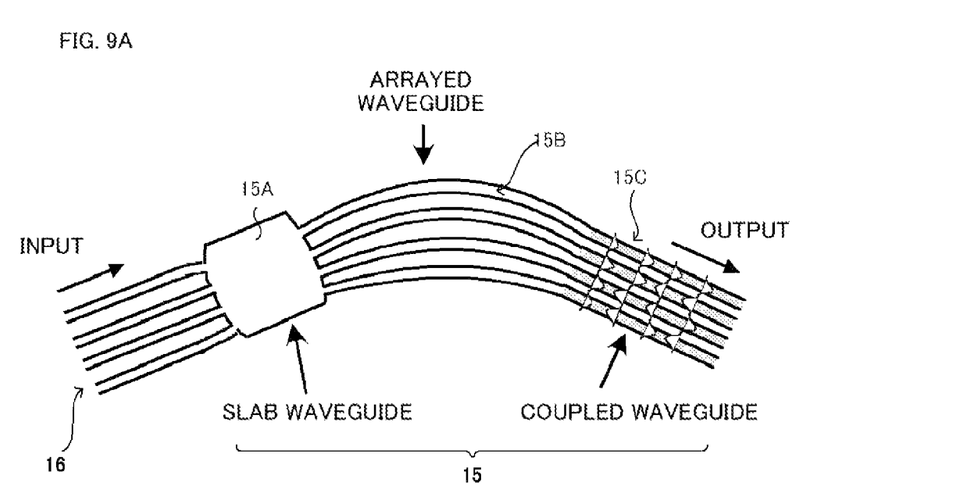
FIG. 9 is a diagram showing the configuration of the mode multiplexer/demultiplexer of the present invention.
Figure 9B:
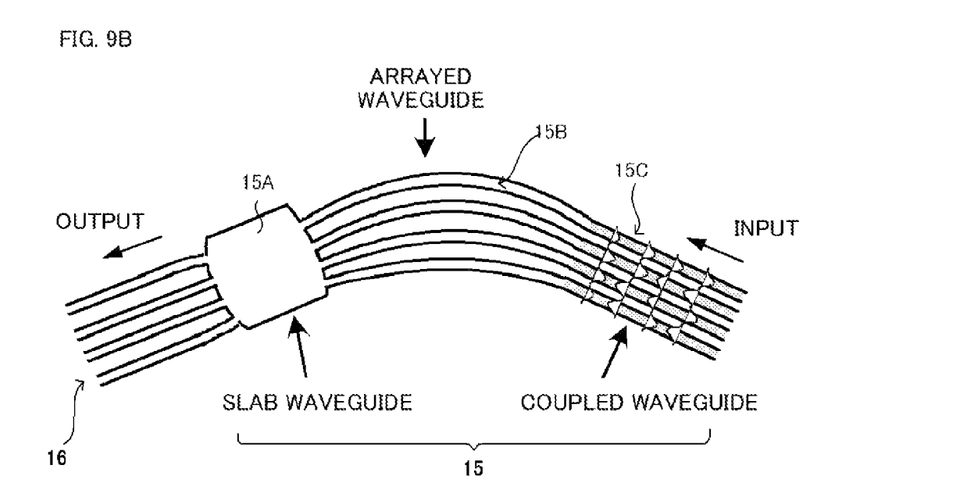

FIG. 9A shows the state in which the optical signals from single-mode fibers 16 are multiplexed and the coupled modes are output to the coupled waveguides 15C, and FIG. 9B shows the state in which the coupled modes of the coupled waveguides 15C are demultiplexed and the optical signals are output to the single-mode fibers 16.

As described above, the present invention may be used to configure a multi-core fiber for high-density mode division multiplexing transmission using a coupled multi-core fiber in which the coupled modes correspond to the independent transmission channels.

The coupled multi-core fiber of the present invention is characterized in that the spacial core density is increased and, as a result, the effective core cross section is increased. On the other hand, when a coupled multi-core fiber is configured in such a way that the refractive index difference among the cores and the diameter of the cores are made approximately constant in the propagation direction, coupled mode interference is generated and the electromagnetic field is localized. This problem may be avoided by decreasing the coherence of the light source of the transmission channels corresponding to the coupled modes. In addition, mode conversion is generated by an irregularity in the boundary between the core and cladding. This problem may be avoided by increasing the refractive index difference between the core and the cladding and by decreasing the core interval to cause a strongly coupled state.

INDUSTRIAL APPLICABILITY

The present invention is applicable to optical communications, optical information processing, and optical interconnection.

The invention claimed is:

1. A coupled multi-core fiber that contains a plurality of single-mode cores in one optical fiber wherein
    coupled modes are formed in which eigen fundamental modes of a plurality of cores are strongly coupled in an electromagnetic distribution of eigen-modes that propagate through the fiber, and a mode division multiplexing transmission system is formed in which coupled modes having different orders are made to correspond to signal transmission channels to multiplex mode-divided transmission channels,
    said multi-core fiber comprises a plurality of cores that have the same propagation constant in fundamental modes in single-mode fibers,
    each neighboring cores are arranged in a range of a core-to-core distance that places the core-to-core coupled state in a strongly-coupled state, and the plurality of cores coupled in the strongly-coupled state form a core group,
    said core group forms a coupled transmission system, which is mode-divided by a plurality of coupled modes that have different propagation constants, and makes the coupled modes correspond, one to one, to transmission channels for multiplexing to form a mode division multiplexing transmission system.

2. The coupled multi-core fiber according to claim 1 wherein
    said plurality of cores are arranged linearly to form a core group,
    a center-to-center interval of neighboring cores is set in a range of distance larger than the length of the core diameter but smaller than the twice of the length of the core diameter to strongly couple the cores in said core group.

3. The coupled multi-core fiber according to claim 1 or 2 wherein
    said coupled multi-core fiber comprises a plurality of said core groups and
    neighboring core groups are spaced to each other at a core-group to core-group distance at which a core in one core group and a core in another core group are in an uncoupled state between the core groups.

4. The coupled multi-core fiber according to claim 3 wherein
    said coupled multi-core fiber comprises a plurality of core groups each comprising a plurality of said linearly-arranged cores and
    the core-group to core-group distance is equal to or larger than the twice of the core diameter.

* * * * *